May 5, 1959  R. P. SCHMITZ  2,884,842
POST HOLE TAMPER
Filed Nov. 3, 1954
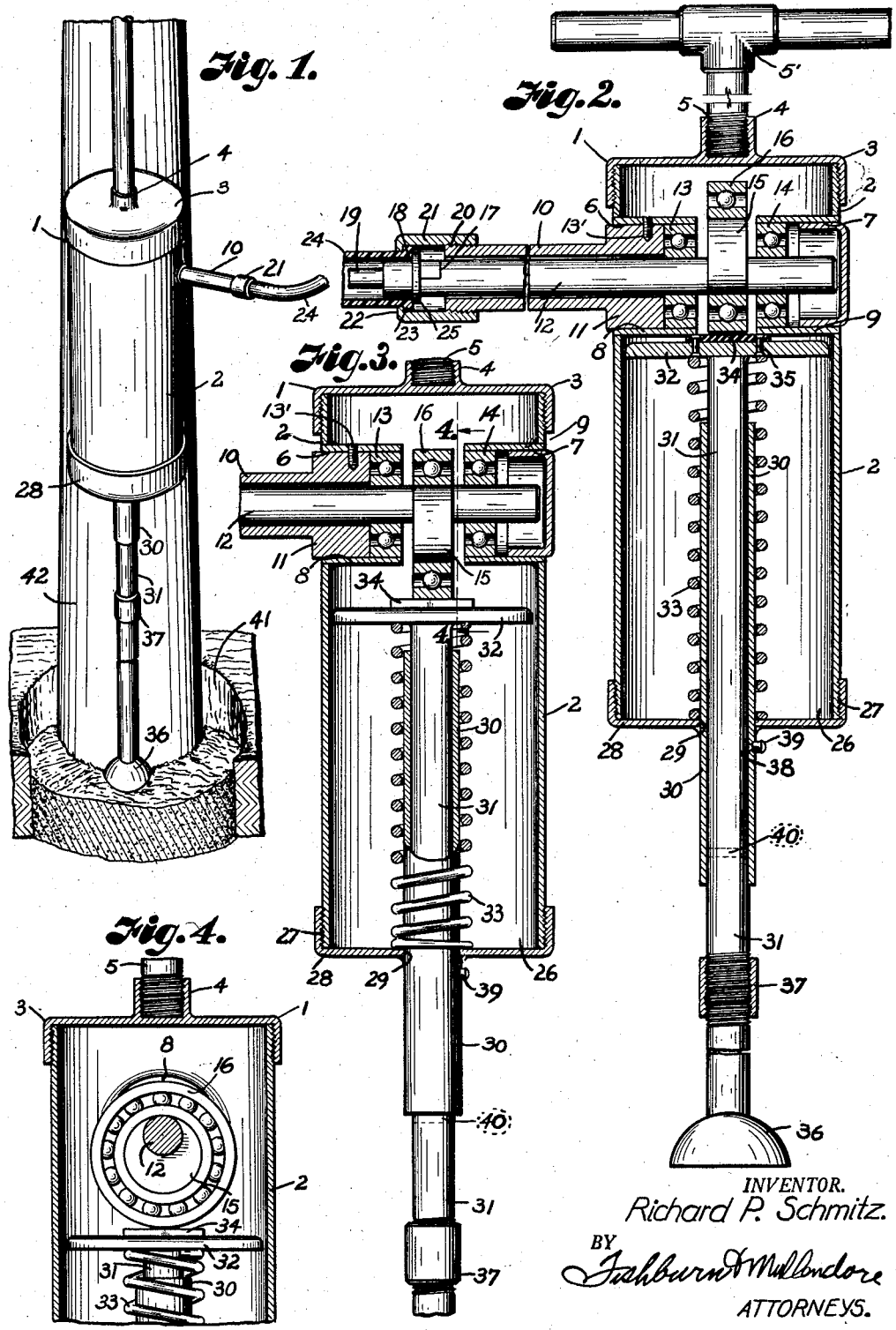
INVENTOR.
Richard P. Schmitz.
BY
Fishburn & Mullendore
ATTORNEYS.

2,884,842
POST HOLE TAMPER

Richard P. Schmitz, Mission, Kans.

Application November 3, 1954, Serial No. 466,565

1 Claim. (Cl. 94—49)

This invention relates to mechanical tampers, and more particularly to a tamper for tamping dirt around postholes operated from the power take-off of a tractor or the like.

Heretofore, in the settling of dirt around postholes and the like after drilling of the hole by what is commonly known as posthole diggers attached to a tractor or the like, it has been necessary to resort to hand tamping of the dirt to settle the same in the hole around the post after the post has been set in place. This, of course, is a slow cumbersome process.

It is the principal objects of the present invention to provide a hand portable tamper of the character described for the settling of dirt around the post in a hole after the post has been set and operated from the power take-off of a tractor a flexible shaft connection; to provide a connection to the power take-off through a flexible shaft connected to a short shaft having a cam thereon whereby rotation of the shaft through the power take-off will cause the cam to contact the head of a rod upon the lower end of which is secured a tamping head so that the cam action will cause an up and down movement of the rod in the mechanism to tamp the dirt around the posthole; to provide bearings for the shaft and cam; to provide a housing for the tamping rod; to provide spring tension means to urge the rod in an upward position to hold the head against the cam on said shaft; to provide means for lubricating said mechanism; to provide means for locking the rod against tamping movement; and to provide a device of this character, simple and economical to manufacture.

In accomplishing these and other objects of the present invention, I have provided improved details of structure the preferred forms of which are illustrated in the accompanying drawings, wherein:

Fig. 1 is a fragmentary perspective view of my invention.

Fig. 2 is a vertical cross section thereof.

Fig. 3 is a vertical cross section particularly illustrating the cam in contact with the head of the tamping post in downward position.

Fig. 4 is a cross-sectional view taken on a line 4—4, Fig. 3, particularly illustrating the cam against said head.

Referring more in detail to the drawings:

1 designates a tamper embodying the features of my invention consisting of a housing 2 having a cap screw 3 with a threaded boss 4 for a shank 5 of a handle 5' for holding of the tamper and moving it around the post as desired. The housing 2 is provided with openings 6 and 7 on each side thereof and secured to the cut out edges by welding or other suitable means are inwardly extending sleeves 8 and 9. A bearing sleeve 10 having an enlarged end 11 is pressed into the sleeve 8 and adapted to engage loosely in the sleeve 10 is a short shaft 12 which extends substantially to the opposite edge or opening 7 of the housing 2. Ball bearings 13 and 14 for the shaft 12 are pressed into the sleeves 8 and 9. The sleeve 10 is held in the sleeve 8 by a set screw 13' (Fig. 2). A cap member 14' is pressed into the opening 7 to prevent dust and dirt from entering therein.

A cam 15 is rigidly secured to the shaft 12 and is enclosed by the races of a ball bearing 16 engaging between the bearings 13 and 14. The free end of the shaft 12 is provided with cut-away portions 17 forming shoulders adapted to receive a coupling 18 of a flexible shaft 19 attached to the power take-off of a tractor (not shown). The outer end of the sleeve 10 is threaded as indicated at 20 and a threaded connection 21 is adapted to engage thereon which has a flange 22 engaging a flange 23 on the flexible shaft covering 24 to urge the connection in contact with the end of the shaft through a shoulder 25 on the flexible coupling for rotating the shaft when power is applied.

The lower end of the housing 2 is opened as indicated at 26 and is provided with threads 27 for receiving a threaded cap screw 28 having a central opening 29 to which is welded or otherwise rigidly secured a sleeve 30 which extends a substantial distance into the housing as illustrated in Figs. 2 and 3. A rod 31 engages in the sleeve 30 and secured to the upper end thereof is a plate 32. Engaging the underside of the plate 32 and the inside of the cap 28 is a coil spring 33 for urging the rod 31 upwardly in the housing 2. A cushioning head member 34 is secured to the upper side of the head 32 by screws or the like 35 with which the cam 15 directly engages to cushion the impact on the rod 31.

The rod 31 is provided with a tamping head 36 as is the usual practice and I have here shown a threaded coupling 37 on the rod so that different tamping lengths may be used as desired.

The sleeve 30 is provided with a lubricating opening 38 by connection 39. The rod is provided with an opening 40 for a pin (not shown) which may be inserted therein when the rod 31 is below the sleeve 28 to prevent the rod from movement when the power remains on, and for disassembling the structure.

In operation of a device constructed and assembled as described after the hole 41 has been dug, either mechanically or by hand, the post 42 is set in place and loose dirt or other material placed therein, the flexible shaft 19 being hooked to the power take-off of the tractor or other vehicle is then connected through the coupling 18 to the short shaft 12. By holding of the handle 5' of the tamper in the desired position in the hole the tamping head will contact the dirt or other material in the hole 41 and tamp the same through operation of the motor of the tractor and rotation of the cam 15 in the bearing 16 on the shaft 12 will cause the bearing to act against the head 34 of the rod 31.

It will be obvious from the foregoing that I have provided an improved tamper which may be operated from the power take-off of a tractor which operates the posthole digger for tamping of the dirt in the hole after the post is set and which is maneuverable around the post for tamping the entire surface of the dirt in the open hole.

What I claim and desire to secure by Letters Patent is:

A device for tamping dirt around a post set in an open hole operable from the power take-off of a tractor or the like including a flexible shaft comprising, a housing having open ends and openings in opposite sides near the top thereof, sleeves secured in said openings and extending inwardly thereof with adjacent ends being spaced apart, a cap for the upper open end forming a chamber in said housing above said sleeves, a sleeve bearing member pressed into one of said openings transversely of the housing and having a shank with a threaded end, a shaft extending through said sleeve bearing member to substantially the opposite side of the housing, bearings in the adjacent ends of said first-named sleeves for said shaft, means retaining said bearings on the shaft, a cylindrical cam member on said shaft between said bearings and eccentric to the axis of the portion of the shaft in said sleeves, a bearing encircling said cam, a cap for the lower end of the housing having a central opening and forming a chamber below said first-named sleeves, said cam moving in said chambers upon rotation of said shaft, a sleeve rigidly secured in said opening and having one end spaced from the first-named sleeves, a rod operable in said sleeve and having one end terminating near but spaced from said first-named sleeves, a plate on said one end of the rod and spaced above said sleeve, a relatively flat cushioning head on said plate engageable by said bearing encircling the cam on said shaft and adapted to engage said adjacent ends of the first-named sleeves when the rod is at its uppermost position, a coil spring surrounding said rod having one end engaging the cap on the lower end of the housing and its other end engaging said plate for normally urging said rod upwardly whereby the cushioning head engages said first-named sleeves to stop the upward movement of said rod, a handle on said first-named cap, a tamping head on the lower end of said rod, and means connecting the flexible shaft connection to said shaft including a threaded sleeve engaging the threaded end of said first-named sleeve.

References Cited in the file of this patent

UNITED STATES PATENTS

| | | |
|---|---|---|
| 875,940 | Mason | Jan. 7, 1908 |
| 1,537,358 | Lartigue | May 12, 1925 |
| 1,679,884 | Thomas | Aug. 7, 1928 |
| 2,004,083 | Scott | June 4, 1935 |
| 2,017,470 | Miller | Oct. 15, 1935 |
| 2,124,024 | Alkin | July 19, 1938 |
| 2,175,846 | Margolis | Oct. 10, 1939 |
| 2,215,455 | Abernathy et al. | Sept. 24, 1940 |
| 2,226,559 | Groom | Dec. 31, 1940 |
| 2,342,601 | Pyle | Feb. 22, 1944 |

FOREIGN PATENTS

| | | |
|---|---|---|
| 145 | Australia | Nov. 16, 1926 |